United States Patent
Mowers et al.

(10) Patent No.: US 7,401,235 B2
(45) Date of Patent: Jul. 15, 2008

(54) PERSISTENT AUTHORIZATION CONTEXT BASED ON EXTERNAL AUTHENTICATION

(75) Inventors: David R. Mowers, Issaquah, WA (US);
Daniel Doubrovkine, Bellevue, WA (US); Roy Leban, Redmond, WA (US);
Donald E. Schmidt, Redmond, WA (US); Ram Viswanathan, Bellevue, WA (US); John E. Brezak, Woodinville, WA (US); Richard B. Ward, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 837 days.

(21) Appl. No.: 10/144,059

(22) Filed: May 10, 2002

(65) Prior Publication Data
US 2003/0212806 A1 Nov. 13, 2003

(51) Int. Cl.
| G06F 7/04 | (2006.01) |
| G06F 17/30 | (2006.01) |
| G06F 15/173 | (2006.01) |
| G06K 9/00 | (2006.01) |
| H04L 9/32 | (2006.01) |

(52) U.S. Cl. .................. 713/200; 726/2; 726/10; 709/220; 709/203

(58) Field of Classification Search .......... 726/2, 726/10; 709/200, 203
See application file for complete search history.

(56) References Cited

U.S. PATENT DOCUMENTS

| 5,550,981 | A | * | 8/1996 | Bauer et al. ............... 709/220 |
| 5,815,574 | A |   | 9/1998 | Fortinsky |
| 5,864,665 | A | * | 1/1999 | Tran ......................... 726/10 |
| 6,055,637 | A |   | 4/2000 | Hudson et al. |
| 6,092,196 | A |   | 7/2000 | Reiche |
| 6,785,015 | B1| * | 8/2004 | Smith et al. .............. 358/1.15 |
| 2002/0150253 | A1 | * | 10/2002 | Brezak et al. .............. 380/281 |
| 2004/0193329 | A1 | * | 9/2004 | Ransom et al. ............. 700/286 |
| 2005/0144437 | A1 | * | 6/2005 | Ransom et al. ............. 713/151 |

FOREIGN PATENT DOCUMENTS

| EP | 0503765 A2 | 9/1992 |
| EP | 0 503 765 B1 | 7/1998 |

OTHER PUBLICATIONS

Kormann, David P., Rubin, Aviel D., "Risks of the Passport Single Signon Protocol"; IEEE Computer Networks, Jul. 2000, 12 pgs.
Sandhu, Ravi S.; Samarati, Pierangela; "Access Control: Principles and Practice"; IEEE Communications Magazine; Piscataway, N.J.; v 32 n 9; Sep. 1994; pp. 40-48.
Slemko, Marc "Microsoft Passport to Trouble", (Nov. 5, 2001).
Slemko, "Microsoft Passport to Trouble", Nov. 5, 2001, <<http://allive.znep.com/~marcs/passport/index.html>>.

* cited by examiner

*Primary Examiner*—Nasser Moazzami
*Assistant Examiner*—Chinwendu C Okoronkwo

(57) ABSTRACT

Methods and systems are provided to allow users that are authenticated by a trusted external service to gain controlled levels of access to selected local computing resources without requiring the user to also have conventional access control capabilities for the resources.

31 Claims, 6 Drawing Sheets

PERSISTENT AUTHORIZATION CONTEXT BASED ON EXTERNAL AUTHENTICATION

RELATED PATENT APPLICATIONS

The present patent application is related to U.S. patent application Ser. No. 09/886,146, titled "Methods And Systems For Controlling The Scope Of Delegation Of Authentication Credentials", filed Jun. 20, 2001, which is hereby incorporated by reference.

TECHNICAL FIELD

This invention relates generally to computer access control, and more particularly to methods and systems for providing a local system authorization context for a user based on an external authentication of the user.

BACKGROUND

Access control is paramount to computer security. To protect the integrity of computer systems and the confidentiality of important data, various access control schemes have been implemented to prevent unauthorized users and malicious attackers from gaining access to computer resources.

To ensure the comprehensiveness of computer security, access control is often implemented on various levels. For instance, on the level of one computer, a user is typically required to go through a logon procedure in which the computer determines whether the user is authorized to use the computer. In addition, on the level of a computer network, a user is commonly required to go through a user-authentication process for purposes of controlling the user's access to various network services. Even after a network access control server has authenticated the user, the user may still have to request a permit for a specific server in order to access that service. Various schemes based on different protocols, such as the Kerberos 5 protocol, have been proposed and implemented for controlling network access control by means of user authentication.

Generally, the user logon for a computer and the user authentication for network access control are two separate procedures. Nevertheless, to minimize the burden on a user in dealing with the different access control schemes, the user logon and the user authentication for network access are sometimes performed together. For example, in the case where the user authentication is implemented under the Kerberos protocol, when the user logs on the computer, the computer may also initiate a Kerberos authentication process. In the Kerberos authentication process, the computer contacts a Kerberos Key Distribution Center (KDC) to first obtain a ticket-granting ticket (TGT) for the user. The computer can then use the TGT to obtain, from the KDC, a session ticket for itself. As networks have evolved, there has been a trend to have multiple tiers of server/service computers arranged to handle client computer requests. A simple example is a client computer making a request to a World Wide Web website via the Internet. Here, there may be a front-end web server that handles the formatting and associated business rules of the request, and a back-end server that manages a database for the website. For additional security, the web site may be configured such that an authentication protocol forwards (or delegates) credentials, such as, e.g., the user's TGT, and/or possibly other information from the front-end server to a back-end server. This practice is becoming increasingly common in many websites, and/or other multiple-tiered networks.

Delegation and other like techniques are useful when all of the servers/services and the client agree to use the same authentication process. There is not, however, just one authentication process in use today. Co-pending U.S. patent application Ser. No. 09/886,146 presents improvements for controlling the delegation.

If the user is authenticated for a network/system, then there is usually one or more additional authorization access control checks to prevent the user from accessing resources that he/she is not authorized to access. Once a user has been authenticated and passed the applicable access control checks, the user is said to be "authorized". In certain systems, for example, access control is based on having access control lists (ACLs) for the various services and resources (i.e., objects). An ACL usually includes access control entries (ACEs), in which zero or more security identifiers (SIDs) may be included. SIDs may be associated with one user or groups of users allowed to access the object. If there are no SIDs in the ACL, then no user will have access to the object. If there are SIDs in the ACL, then users that can produce at least one matching SID will be allowed to access the object.

Thus, when an authenticated user logs on, an authentication context is created for the user, for example, by generating a token (e.g., an access token) that is associated with the user. The token typically includes SIDs that are associated with the user. For example, the user's token may include a unique SID assigned to the user plus a group SID assigned to the user's business department. When the user attempts to access an object the object's ACL is compared to the user's token. If the user's token includes at least one SID that matches a SID within the object's ACL, then the authenticated user is authorized to access the object in some manner. For example, the user may have read and write permissions for a file generated by other members of his/her business department (i.e., another group member).

Such authorization schemes tend to work very well for systems that are carefully controlled and managed. For example, an enterprise level computer network within a corporation usually provides a cohesive environment wherein the users and ACLs can be carefully controlled by a centralized and/or distributed authentication and access control system. On the other hand, for very large networks, e.g., the Internet, and/or otherwise significantly non-cohesive networks, authentication and access control can be much more difficult, especially when there is a desire to serve as many of the users as possible, including users that do not have local access control accounts. As software programs and resources migrate towards network-based services, the need to be able to authorize user activity associated with such network services will further increase.

Consequently, there is a need for improved authorization methods and systems. Preferably the methods and systems will allow users that are authenticated by a trusted external resource to gain some controlled level of access to certain objects without requiring the user to also have a unique user account associated with the object. Moreover, the methods and systems should not significantly degrade the scalability of arrangements that are capable of providing access to objects for very large numbers of users.

SUMMARY

Improved methods and systems are provided herein, which allow users that are authenticated by a trusted external resource to gain controlled levels of access to selected objects without requiring the user to also have a unique local user account. The methods and systems can be implemented without significantly degrading the scalability of computer system and/or network arrangements that are configured to provide access to various resources for very large numbers of users.

The above stated needs and others may be satisfied, for example, by a method for providing access control to at least one computing resource. The method includes receiving a unique identifier that is associated with a user seeking access to the computing resource(s). Preferably, the unique identifier has been generated by another computing resource that is deemed trustworthy and/or serves and often authenticates the user in some manner. The method includes translating the received unique identifier into a security identifier (SID) that is suitable for use with the access control mechanism protecting the computing resource(s). The method further includes determining if the SID matches at least one other SID that was previously stored by the access control mechanism and is associated with the computing resource(s). In certain exemplary implementations, the unique identifier includes a pair wise unique identifier (PUID), such as, e.g., that used by Passport services provided by Microsoft Corp., and the access control mechanism uses an access control list (ACL) to establish users or groups of users allowed to access the computing resource(s)

In accordance with certain other implementations of the present invention, a method is provided for establishing access control permissions to at least one computing resource. Here, the method includes receiving at least one electronic mail (e-mail) address for at least one user that is to be granted at least limited access to the computing resource(s). For example, a user that is authorized by the access control mechanism may input an e-mail address of another user and specify the computer resource(s) to be accessed and/or privileges that this other user will have when accessing the computer resource(s). The method further includes providing the e-mail address to a trustworthy service capable of returning a unique identifier associated with the user based on the e-mail address. The method includes receiving the unique identifier and then setting at least one access control permission based on the unique identifier. This may include, e.g., translating the unique identifier into a SID and associating the SID with at least one access control list ACL for the computing resource(s).

In accordance with still other aspects of the present invention, a method for translating a PUID into a corresponding SID is provided. The method includes receiving the PUID, subdividing it into at least one sub authority identifier portion and at least one member identifier portion, and arranging the sub authority identifier portion and the member identifier portion to form the SID.

A system for controlling access to at least one computing resource is also provided, in accordance with certain implementations of the present invention. The system includes logic and memory that are configurable to receive a unique identifier associated with a user that is to be provided access to the computing resource(s), translate the unique identifier into a security identifier (SID), and determine if the SID matches at least one other SID that is stored in the memory and associated with the computing resource(s).

Certain exemplary systems are provided for setting access control permissions for the computing resource(s). One system includes a communication network connecting a first device and at least one other device. The first device is configured to accept an e-mail address for at least one user that is to be granted at least limited access to the computing resource(s), provide the e-mail address to the other device over the network, receive from the other device over the network a corresponding unique identifier associated with the e-mail address, and set at least one access control permission associated with the computing resource(s) based on the unique identifier. The other device is configured to receive the e-mail address over the network, convert the e-mail address to the unique identifier, and output the unique identifier to the first device over the network.

BRIEF DESCRIPTION OF THE DRAWINGS

A more complete understanding of the various methods and systems of the present invention may be had by reference to the following detailed description when taken in conjunction with the accompanying drawings wherein.

DETAILED DESCRIPTION

Overview

Figure 1:
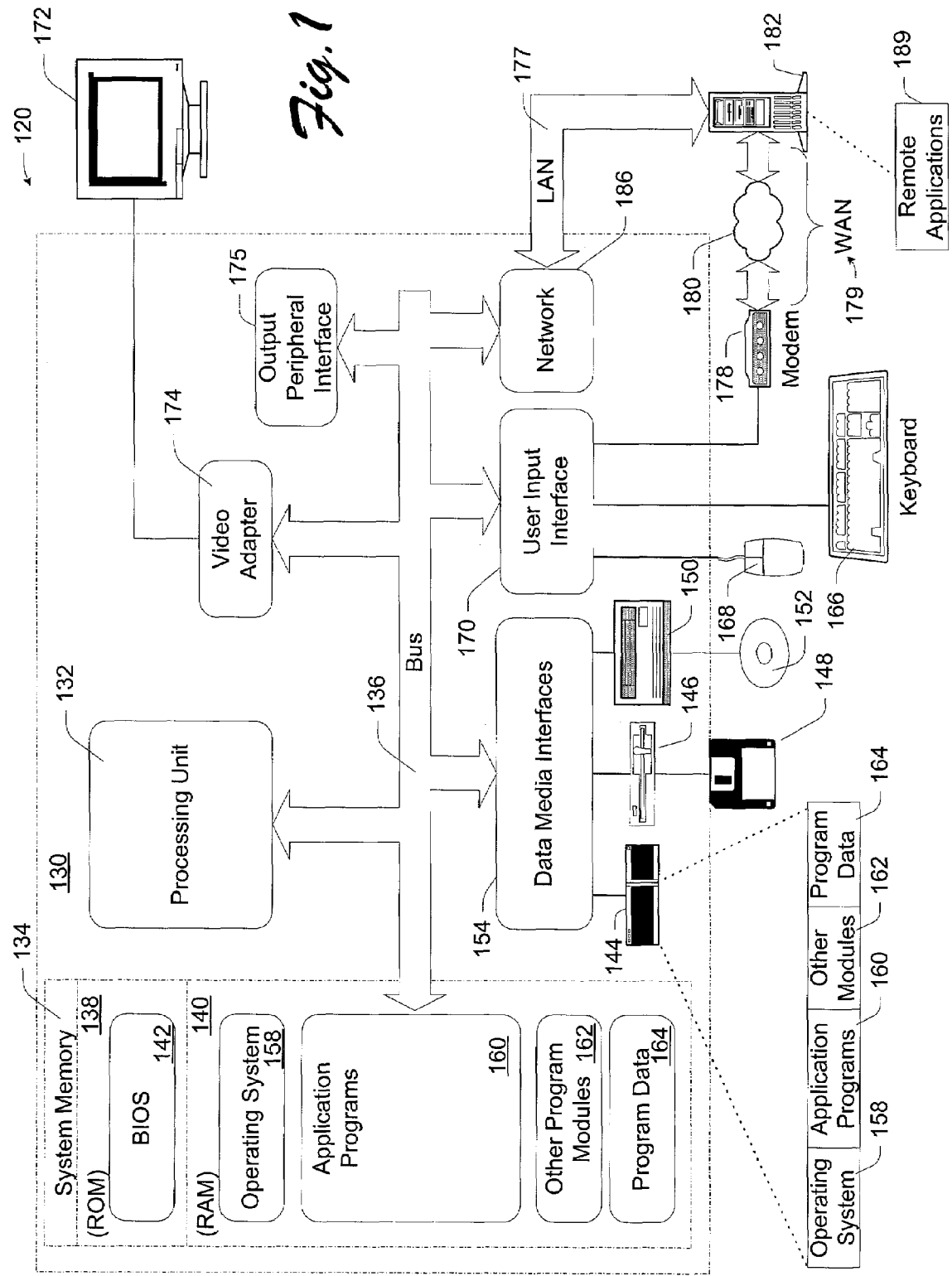
FIG. 1 is a block diagram generally illustrating an exemplary computer system suitable for use with certain implementations of the present invention.

Some exemplary methods and systems are described herein that can be implemented in authenticating users/resources and/or providing an authorization context for users attempting to gain access to certain resources.

The next section describes an exemplary computing environment. The sections after that briefly describe exemplary S4U2proxy and S4U2self techniques that are the subjects of co-pending U.S. patent application Ser. No. 09/886,146.

Thereafter, techniques are described and shown in the accompanying drawings for providing a novel authorization scheme in accordance with certain aspects of the present invention. Improved methods and systems are provided, for example, which allow client services (e.g., users) that are authenticated by a trusted external service to gain controlled levels of access to selected local server resources without requiring the client service to also have a local access control capability. As will become apparent, the authorization schemes described herein can be employed in a variety of ways to improve the security of computing resources and the ability of users to gain access to services provided by the computing resources.

Exemplary Computing Environment

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing environment 120 on which the subsequently described methods and systems may be implemented.

Exemplary computing environment 120 is only one example of a suitable computing environment and is not intended to suggest any limitation as to the scope of use or functionality of the improved methods and systems described herein. Neither should computing environment 120 be interpreted as having any dependency or requirement relating to any one or combination of components illustrated in computing environment 120.

The improved methods and systems herein are operational with numerous other general purpose or special purpose computing system environments or configurations. Examples of well known computing systems, environments, and/or configurations that may be suitable include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As shown in FIG. 1, computing environment 120 includes a general-purpose computing device in the form of a computer 130. The components of computer 130 may include one or more processors or processing units 132, a system memory 134, and a bus 136 that couples various system components including system memory 134 to processor 132.

Bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 130 typically includes a variety of computer readable media. Such media may be any available media that is accessible by computer 130, and it includes both volatile and non-volatile media, removable and non-removable media.

In FIG. 1, system memory 134 includes computer readable media in the form of volatile memory, such as random access memory (RAM) 140, and/or non-volatile memory, such as read only memory (ROM) 138. A basic input/output system (BIOS) 142, containing the basic routines that help to transfer information between elements within computer 130, such as during start-up, is stored in ROM 138. RAM 140 typically contains data and/or program modules that are immediately accessible to and/or presently being operated on by processor 132.

Computer 130 may further include other removable/non-removable, volatile/non-volatile computer storage media. For example, FIG. 1 illustrates a hard disk drive 144 for reading from and writing to a non-removable, non-volatile magnetic media (not shown and typically called a "hard drive"), a magnetic disk drive 146 for reading from and writing to a removable, non-volatile magnetic disk 148 (e.g., a "floppy disk"), and an optical disk drive 150 for reading from or writing to a removable, non-volatile optical disk 152 such as a CD-ROM/R/RW, DVD-ROM/R/RW/+R/RAM or other optical media. Hard disk drive 144, magnetic disk drive 146 and optical disk drive 150 are each connected to bus 136 by one or more interfaces 154.

The drives and associated computer-readable media provide nonvolatile storage of computer readable instructions, data structures, program modules, and other data for computer 130. Although the exemplary environment described herein employs a hard disk, a removable magnetic disk 148 and a removable optical disk 152, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 148, optical disk 152, ROM 138, or RAM 140, including, e.g., an operating system 158, one or more application programs 160, other program modules 162, and program data 164.

The improved methods and systems described herein may be implemented within operating system 158, one or more application programs 160, other program modules 162, and/or program data 164.

A user may provide commands and information into computer 130 through input devices such as keyboard 166 and pointing device 168 (such as a "mouse"). Other input devices (not shown) may include a microphone, joystick, game pad, satellite dish, serial port, scanner, camera, etc. These and other input devices are connected to the processing unit 132 through a user input interface 170 that is coupled to bus 136, but may be connected by other interface and bus structures, such as a parallel port, game port, or a universal serial bus (USB).

A monitor 172 or other type of display device is also connected to bus 136 via an interface, such as a video adapter 174. In addition to monitor 172, personal computers typically include other peripheral output devices (not shown), such as speakers and printers, which may be connected through output peripheral interface 175.

Computer 130 may operate in a networked environment using logical connections to one or more remote computers, such as a remote computer 182. Remote computer 182 may include many or all of the elements and features described herein relative to computer 130.

Logical connections shown in FIG. 1 are a local area network (LAN) 177 and a general wide area network (WAN) 179. Such networking environments are commonplace in offices, enterprise-wide computer networks, intranets, and the Internet.

When used in a LAN networking environment, computer 130 is connected to LAN 177 via network interface or adapter 186. When used in a WAN networking environment, the computer typically includes a modem 178 or other means for establishing communications over WAN 179. Modem 178, which may be internal or external, may be connected to system bus 136 via the user input interface 170 or other appropriate mechanism.

Depicted in FIG. 1, is a specific implementation of a WAN via the Internet. Here, computer 130 employs modem 178 to establish communications with at least one remote computer 182 via the Internet 180.

In a networked environment, program modules depicted relative to computer 130, or portions thereof, may be stored in a remote memory storage device. Thus, e.g., as depicted in FIG. 1, remote application programs 189 may reside on a memory device of remote computer 182. It will be appreciated that the network connections shown and described are exemplary and other means of establishing a communications link between the computers may be used.

Summary of Exemplary S4U2Proxy and S4U2Self Delegation Techniques

This description will now briefly focus on certain techniques for controlling the scope of delegation of authentication credentials in a client-server network environment. In this example, a Kerberos based system is described. These S4U2Proxy and S4U2Self techniques and the subsequently described authorization techniques may or may not be implemented in the same systems and a may also be implemented in other certificate-based authentication systems.

As mentioned above, having possession of a client's ticket granting ticket (TGT) and associated authenticator allows the holder to request tickets on behalf of the client from the trusted third-party, e.g., a key distribution center (KDC). Such unconstrained delegation is currently supported in certain implementations of Kerberos that have forwarded ticket delegation schemes.

With this in mind, U.S. patent application Ser. No. 09/886,146 describes methods and systems to constrain or otherwise better control the delegation process. The delegation process can be controlled through a service-for-user-to-proxy (S4U2proxy) technique that allows a server or service, such as, e.g., a front-end server/service, to request service tickets on behalf of a client for use with other servers/services. The S4U2proxy protocol advantageously provides for constrained delegation in a controllable manner that does not require the client to forward a TGT to the front-end server. Another technique is a service-for-user-to-self (S4U2self) protocol that allows a server to request a service ticket to itself, but with the client's identity being provided in the resulting service ticket. This allows, for example, a client that has been authenticated by other authentication protocols to receive a service ticket that can be used with the S4U2proxy protocol to provide constrained delegation. There are two exemplary forms to the S4U2self technique, namely a "no evidence" form and an "evidence" form. In the no evidence form, the server is trusted to authenticate the client, for example, using another security/authentication mechanism that is private to the server. In the evidence form, the KDC (or a trusted-third-party) makes the authentication based on information (evidence) provided about the client obtained when the client authenticated to the server.

A client may therefore access servers/services within a Kerberos environment regardless as to whether the client has been authenticated by Kerberos or some other authentication protocol. Consequently, back-end and/or other servers/services can be operated in an essentially Kerberos only environment.

Figure 2:
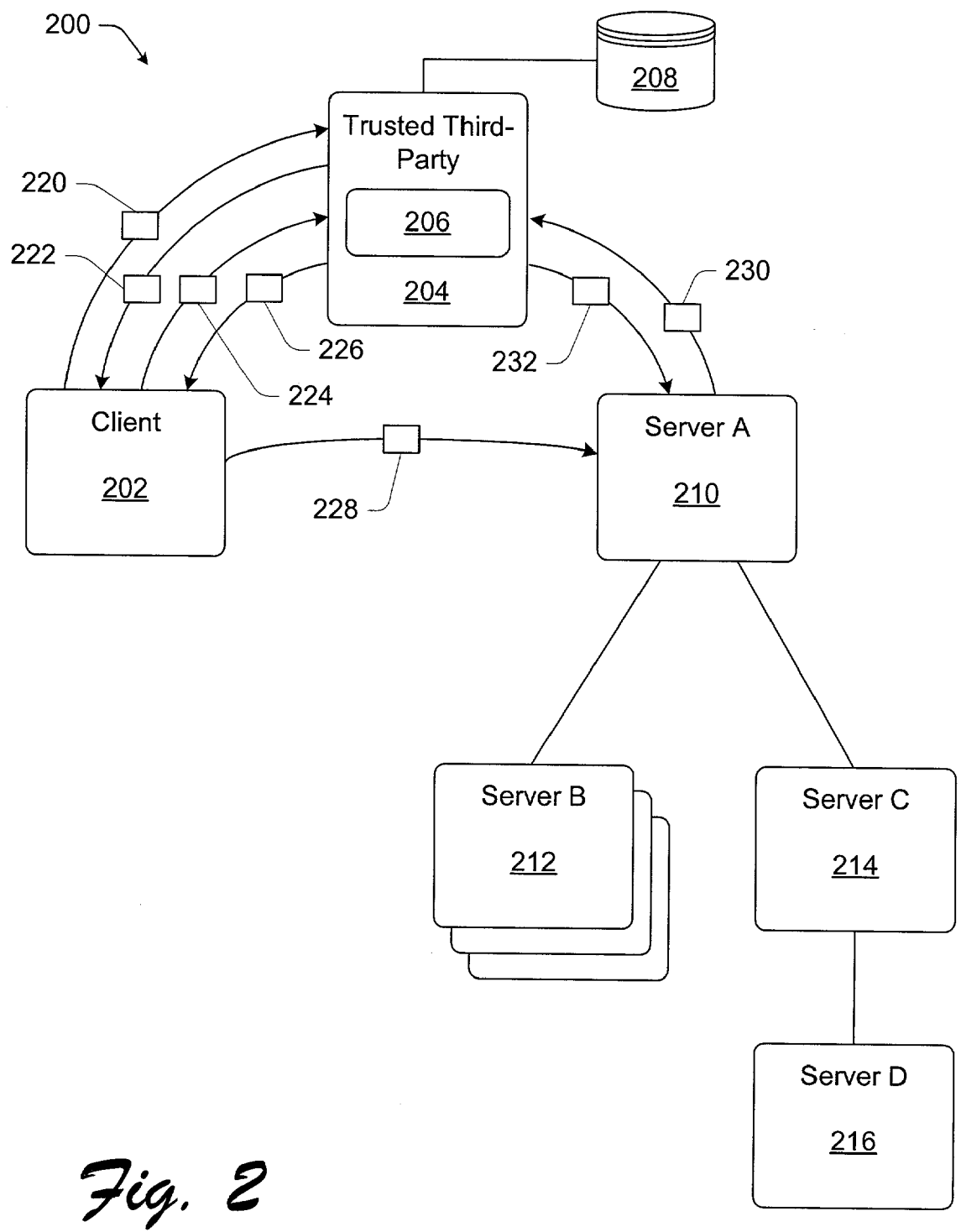
FIG. 2 is a block diagram depicting a service-for-user-to-proxy (S4U2proxy) process that is performed within a client-server environment and suitable for use with certain implementations of the present invention.

Reference is now made to the block diagram in FIG. 2, which depicts an S4U2proxy protocol/process within a client-server environment 200. As shown, a client 202 is operatively coupled to a trusted third-party 204 having an authentication service 206, e.g., a KDC, a certificate granting authority, a domain controller, and/or the like. Authentication service 206 is configured to access information maintained in a database 208. Client 202 and trusted third-party 204 are further operatively coupled to a server, namely server A 210. Note, as used herein, the terms server and service are used intermixable to represent the same or similar functionality.

In this example, server A 210 is a front-end server to a plurality of other servers. Thus, as depicted, server A 210 is operatively coupled to server B 212 and server C 214. As illustrated, server B 212 may be a replicated service. Also, server C 214 is further operatively coupled to a server D 216.

In response to a user logging on at client 202, an authentication request (AS_REQ) message 220 is sent to authentication service 206, which responds with an authentication reply (AS_EP) message 222. Within AS_REP message 222, is a TGT associated with the user/client. The same or similar procedure (not illustrated) is followed to authenticate server A 210.

When client 202 wants to access server A 210, client 202 sends a ticket granting service request (TGS_REQ) message 224 to authentication service 206, which returns a ticket granting service reply (TGS_REP) message 226. TGS_REP message 226 includes a service ticket associated with client 202 and server A 210. Subsequently, to initiate a communication session, client 202 forwards the service ticket to server A 210, in an application protocol request (AP_REQ) message 228. Such processes/procedures are well known, and as such are not disclosed herein in greater detail.

In certain systems, to support delegation the client would need to provide server A 210 with the client's TGT to allow server A 210 to request additional service tickets on behalf of client 202. This is not necessary with the S4U2proxy protocol. Instead, when server A 210 needs to access another server on behalf of client 202, for example, server C 214, then server A 210 and authentication service 206 operate according to the S4U2proxy protocol.

Server A 210 sends a TGS_REQ message 230 to authentication service 206. TGS_REQ message 230 includes the TGT for server A 210 and the service ticket received from client 202, and identifies the desired or targeted server/service to which client 202 is seeking access, e.g., server C 214. In Kerberos, for example, there is a defined extensible data field, which is typically referred to as the "additional tickets" field. This additional tickets field can be used in the S4U2proxy protocol to carry the service ticket received from client 202, and a KDC options field can include a flag or other indicator that instructs the receiving KDC to look in the additional tickets field for a ticket to be used to supply a client identity. Those skilled in the art will recognize that these or other fields and/or data structures can be used to carry the necessary information to authentication service 206.

In processing TGS_REQ 230, authentication service 206 determines if client 202 has authorized delegation, for example, based on the value of a "forwardable flag" established by client 202. Thus, delegation per client is enforced by the presence of the forwardable flag in the client's service ticket. If client 202 does not want to participate in delegation, then the ticket is not flagged as forwardable. Authentication service 206 will honor this flag as a client initiated restriction.

Authentication service 206 may access additional information in database 208 that defines selected services that server A 210 is allowed to delegate to (or not delegate to) with respect to client 202.

If authentication service 206 determines that server A 210 is allowed to delegate to the targeted server/service, then a TGS_REP message 232 is sent to server A 210. TGS_REP message 232 includes a service ticket for the targeted server/service. This service ticket appears as if client 202 requested it directly from authentication service 206, for example, using the client's TGT. However, this was not done. Instead, authentication service 206 accessed the similar/necessary client information in database 208 after being satisfied that the authenticated client is essentially involved in the request based on the service ticket that authenticated server A 210 received from client 202 and included in TGS_REQ message 230. However, since the client information is carried in the client's ticket, the server only needs to copy the data from the ticket.

In certain implementations TGS_REP message 232 identifies the targeted server/service and client 202, and further includes implementation-specific identity/user/client account data, e.g., in the form of a privilege attribute certificate (PAC), a security identifier, a Unix ID, Passport ID, a certificate, etc. A PAC, for example, may be generated by authentication service 206, or simply copied from the client's service ticket that was included in TGS_REQ message 230. The use of a Passport ID will be further described in the exemplary authorization context generating schemes presented below.

Figure 4:
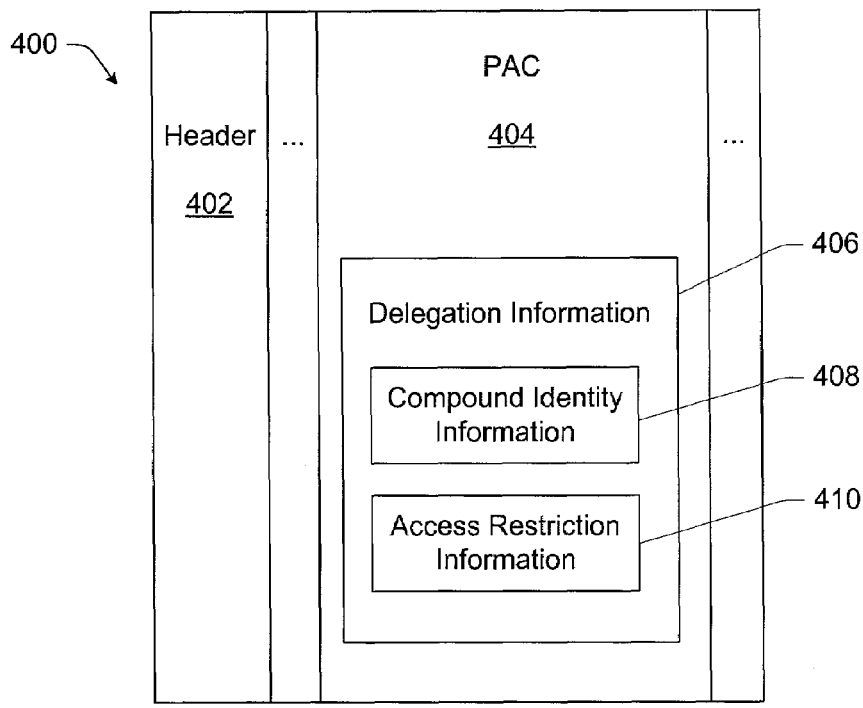
FIG. 4 is an illustrative diagram depicting selected portions of an exemplary message format suitable for use with certain implementations of the present invention.

PAC or other user/client account data may also be configured to include information relating to the scope of delegation. Thus, for example, FIG. 4 is an illustrative diagram depicting selected portions of a Kerberos message 400 having a header 402 and a PAC 404. Here, PAC 404 includes delegation information 406. As illustrated, delegation information 406 includes compound identity information 408 and access restriction information 410.

Compound identity information 408 may, for example, include recorded information about the delegation process, such as, e.g., an indication regarding the fact that server A 210 requested the service ticket on behalf of user/client 202. Here, a plurality of such recorded information may be provided that can be used to string together or otherwise identify the history over multiple delegation processes. Such information may be useful for auditing purposes and/or access control purposes.

Access restriction information 410 may be used, for example, in conjunction with an access control mechanism to selectively allow access to certain servers/services provided that client 202 has either directly or indirectly through server A 210 sought to access the serer/service, but not if the server/service is being indirectly sought through server B 212. This feature adds additional control over the delegation of authentication credentials.

Figure 3A:
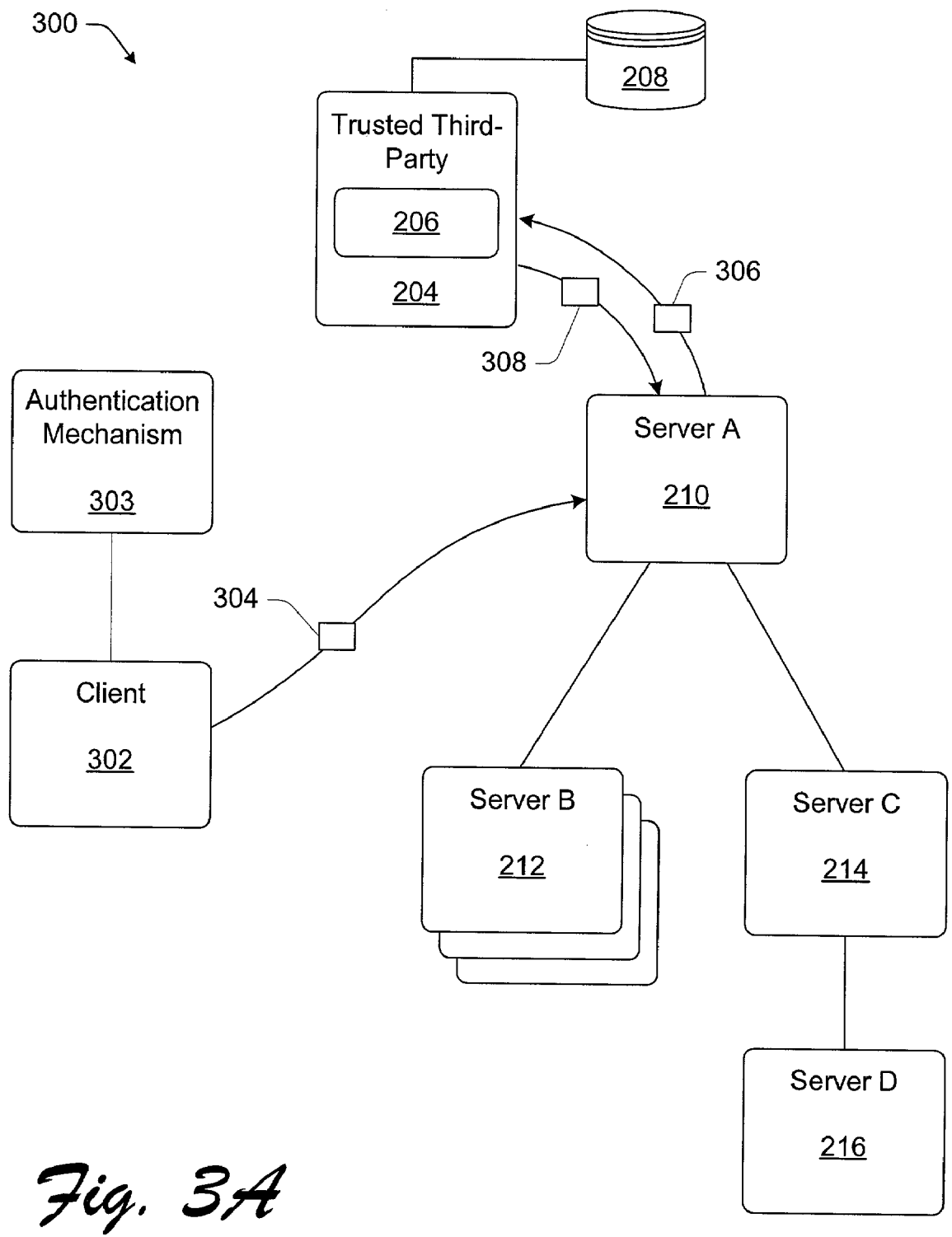
FIG. 3A is a block diagram depicting a service-for-user-to-self (S4U2self) process that is performed within a client-server environment and suitable for use with certain implementations of the present invention.

In the above examples client 202 was authenticated by authentication service 206. However, it is recognized that other clients may not be so authenticated. An example of such a situation is depicted in FIG. 3A. Here, a client 302 has been authenticated using a different authentication protocol mechanism 303. For example, authentication protocol mechanism 303 may include Passport, secure sockets layer (SSL), NTLM, Digest, or other like authenticating protocols/procedures. Here, in this example, it is assumed that client 302 chooses to access a targeted service, which just so happens to be provided by server C 214. This choice can be satisfied using the above-described S4U2proxy protocol, but only after server A 210 has completed/followed an S4U2self protocol/procedure.

One basic premise with the S4U2self protocol is that the server, e.g., server A 210, is able to request a service ticket to itself for any user/client that is accessing the server and which the server has authenticated. The exemplary S4U2self protocol described herein is configured to support clients that have authenticating "evidence" and clients that do not have such authenticating evidence.

In the absence of authentication evidence that can be evaluated by authentication service 206, server A 210 will need to come to "trust" client 302. Thus, for example, if client 302 has an authentication certificate or like mechanism 304 that server A 210 is able to validate, then the client 302 may be determined to be "trusted". Hence, server A 210 is essentially authenticating client 302.

Figure 3B:
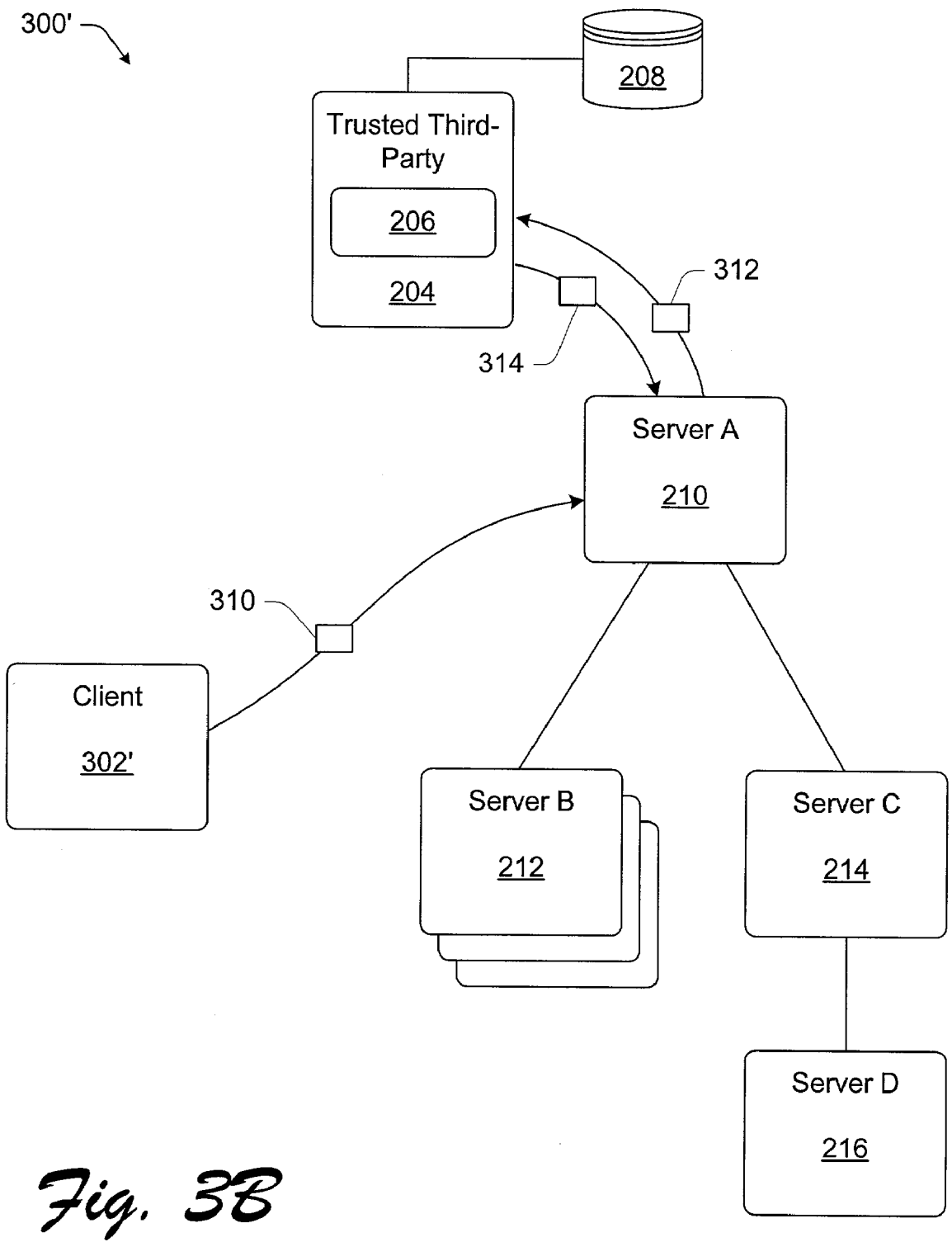
FIG. 3B is a block diagram depicting a service-for-user-to-self (S4U2self) process that is performed within a client-server environment and suitable for use with certain implementations of the present invention.

Next, server A 210 sends a TGS_REQ message 306 to authentication service 206 requesting a service ticket to itself for client 302. In response, authentication service 206 generates a TGS_REP message 308 that includes the requested service ticket. The received service ticket is then used in a subsequent S4U2proxy protocol/procedure to request a service ticket to server C 214 for client 302. In certain Kerberos implementations, for example, this requires that a forwardable flag in the TGS_REP message 308 be set to allow forwarding of the service ticket. The trusted third-party may also build a PAC for client 302, which can then be included in the resulting service ticket If evidence of the authentication does exist for a client 302', then server A 210 can include such evidence in a TGS REQ message 312 as additional pre-authentication data. This is illustratively depicted in environment 300' in FIG. 3B. Here, evidence information 310 is provided by client 302' to server A 210. Evidence information 310 may include, for example, a challenge/response dialog, or other, information generated by another "trusted" entity. Upon receipt of evidence information 310 and subsequent validation, authentication service 206 will grant the requested service ticket to server A 210 itself. It is noted, that in certain implementations, with the use of evidence it may be possible for the server to obtain a restricted TGT for the client.

In certain Kerberos implementations, the forwardable flag in the TGS_REP message 314 will be set to allow forwarding of the service ticket. If a PAC was provided in TGS_REQ message 312, then it can be used in the service ticket; otherwise, a PAC may be generated by authentication service 206 (here, a KDC) based on evidence information 310. For example, in S4U2self, the identity of the client is included in the pre-authentication data. This identity can be used in the construction of the PAC for that client and added to the issued service ticket to the server (for the client).

Exemplary Authorization Context Generating Techniques

The description will now focus on exemplary methods and systems in accordance with certain implementations of the present invention. These methods and systems may be implemented with or without the use of the S4U2proxy and/or S4U2self protocols. These methods and systems may be implemented with or without the use of Kerberos. These methods and systems may be implemented with or without the use of Passport services (provided by Microsoft Corp. of Redmond, Wash.). Those skilled in the art will recognize that the techniques may be implemented using a variety of other protocols and/or services. Nevertheless in these examples, it will be assumed that these protocols and services are available to support the authorization context generating techniques, if needed.

Figure 5:
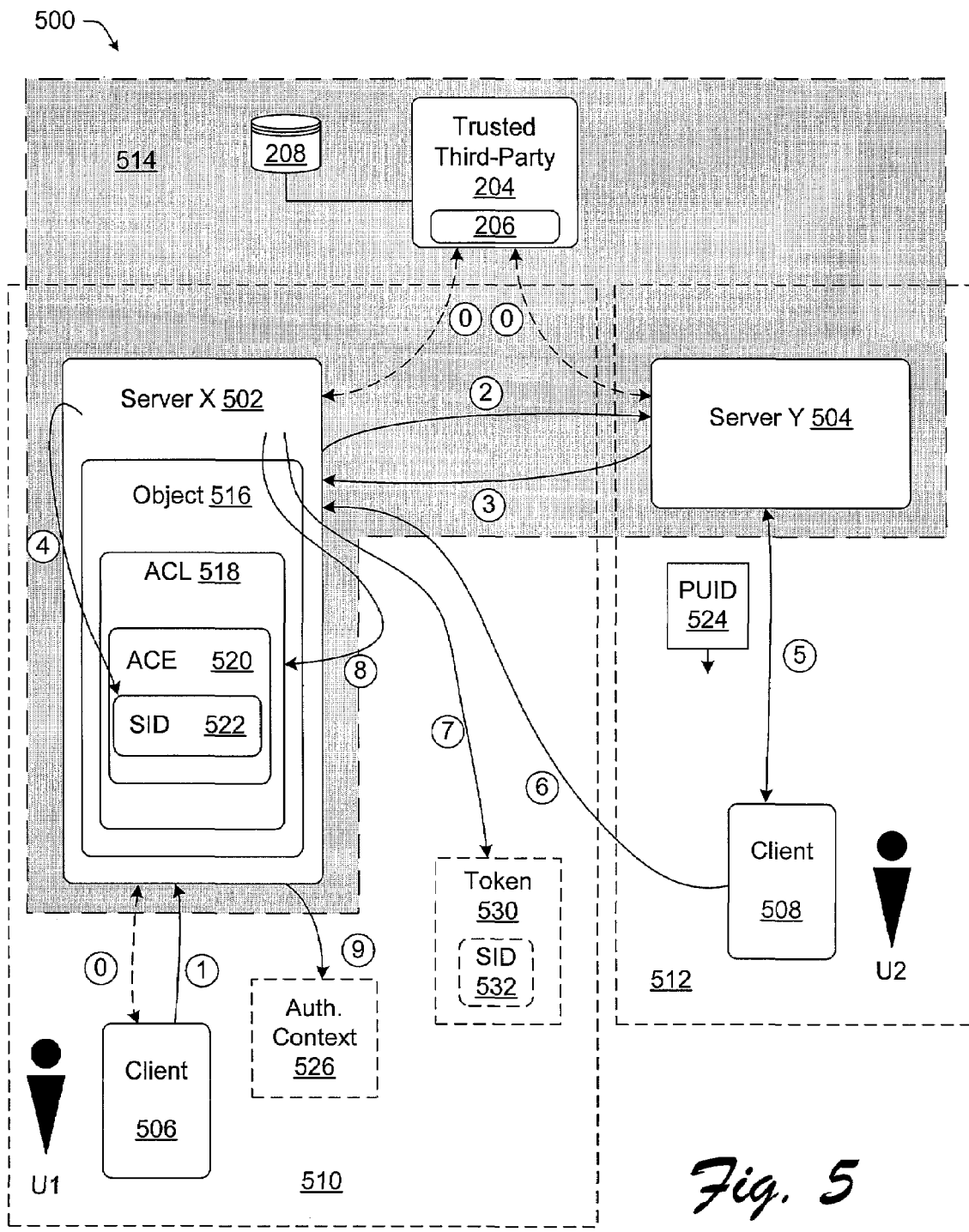
FIG. 5 is an illustrative block diagram depicting a system and process for providing local access control to users authenticated by a trusted resource, in accordance with certain exemplary implementations of the present invention.

Reference is now made to FIG. 5, which is an illustrative block diagram depicting certain features/functions/processes relating to a client-server network arrangement 500 that is capable of providing an authorization context for users that would not otherwise have authorization to access certain resources.

As shown, a server X 502 is operatively coupled to a server Y 504, a first client 506 associated with user #1 (U1), and a second client 508 associated with user #2 (U2). In this example, there are several trust relationships between these devices, as represented by dashed line boxes 510, 512 and 514. Thus, client 506 and server X 502 are configured to form trust relationship 510 when U1 logons to client 506 and server X 502, for example, to access a resource provided by server X 502, such as, object 516. This logon procedure may include authentication and access control. Similarly, client 504 and server Y 508 are configured to form trust relationship 512 when U2 logons to client 504 and server Y502. Further, in this example, server X 502 and server Y 504 are able to form trust relationship 514 via trusted third party 204. Notice, however, that at this point there is no trust relationship between client 508 and server X 502.

A process will now be described using FIG. 5 and later FIG. 6 to illustrate certain aspects of the present invention that allow client 508 to have an authorization context with server X 502 that allows U2 to gain access to object 516. Arrows next to sequential numerical identifiers within a small circle illustratively represent the process acts. Some of the acts may occur in a different order in other implementations.

Act #0 is the creation of trust relationships 510, 512, and 514 as described above. Such trust relationships may be selectively created as needed for certain operations.

In this example, it is assumed that U1 desires to allow U2 to access object 516. While U1 is authorized through trust relationship 510 to access object 516, U2 is not authorized to access object 516 at this time. Moreover, there is a further desire to avoid adding U2 as another authorized user to the access control system of server X 502. This situation can arise, for example, when U1 desires to allow U2 to access U1's online planning calendar that is hosted or otherwise provided through U1's employer. Here, the employer does not want to add a new authorized user account to its system.

Figure 6:
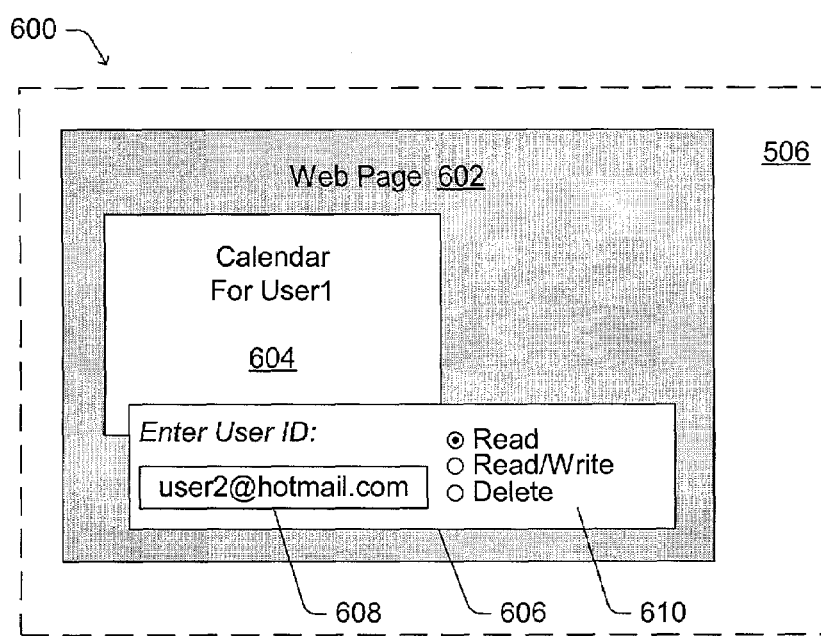
FIG. 6 is an illustrative block diagram depicting an exemplary use of a system and process, e.g., as in FIG. 5, for allowing a user without a local access control account to access certain resources with an adequate level of authorization trust, in accordance with certain aspects of the present invention.

Reference is made to FIG. 6, which is a block diagram 600 showing certain representative features associated with a graphical user interface (GUI) provided to U1 through client 506. In this example, a web page 602 or like screen is displayed for U1 after logging on to server X 502. Within web page 602 object 516 presents a calendar GUI 604 that displays information about U1. U1 is able to open up an entry form 606 that includes an identifier entry field 608 and (optionally) one or more selectable permission settings 610. This is where U1 will initiate the process that will eventually allow U2 to gain access to object 516. U1 enters an identifier for U2. In this example, the identifier includes the unique World Wide Web electronic mail address for U2, namely, user2@hotmail.com. The identifier entered here is for a registered user of the hotmail.com services provided by Microsoft Corp. As a registered user of hotmail.com, U2 is presumed to also have a corresponding Passport account with Microsoft Corp. U1 may also define one or more permission settings 610 for U2 with regard to the access granted to object 516 (here, e.g., an online planning calendar application). Currently, U1 has set permissions for U2 to have read permission. Returning now to FIG. 5, this user identification process is represented by act #1 between client 506 and server X 502.

Server X 502 recognizes that U1 has provided a hotmail.com identifier for U2, and in act #2, communicates with server Y 504, which in this case is presumed to be a well-known Passport server. Here, server X 502 provides the identifier user2@hotmail.com to server Y 504 and requests that server Y 504 provide a corresponding universally unique Passport user identity (PUID) (also often referred to as a Pair wise Unique ID). In act #3, server Y 504 returns the PUID (524) for U2. If trust relationship 514 is a Kerberos based relationship, then the PUID can be returned, for example, in a PAC as previously mentioned.

Server X 502 now has the PUID for U2. In act #4, server X 502 translates the PUID into a corresponding SID 522 suitable for use with the native authentication system of server X 502. As illustrated, object 516 is associated with an ACL 518, having at least one ACE 520 that includes SID 522.

The 64-bit PUID is actually composed of a 16-bit Passport domain authority identifier and a 48-bit member identifier. To form a SID it is desirable to maintain the domain authority as a separate value. To do this, the MemberIDHigh is separated into two parts and the parts are formed as separate sub authorities, for example, as shown below:

S-1-10-21-(HIWORD (MemberIDHigh))-(LOWORD (MemberIDHigh))-MemberIDLow-0

In this example, "S-1-10-21" is a new identifier authority defined by ntseapi.h. In this exemplary implementation, ntseapi.h is a header file used to build the Microsoft® Windows® operating system that contains the definition for this SID value used to construct the PUID-SID. Note that this header would not usually be not directly exposed to developers. However, the declarations in ntseapi.h are published publicly in the Platform SDK in winnt.h.

Thus, an exemplary SID that is created from the PUID or other like identifier returned from a "trusted" source, essentially identifies the well-known sub authority and the member user in a unique combination and in a format compatible with the native authorization system.

In act #5, U2 logons (is authenticated) to server Y 504 and in doing so receives PUID 524. In act#6, U2 connects to server X 502 using a default (e.g., unknown or anonymous) user account and provides information (e.g., in the PAC) including PUID 524 in a request or other like message. In act #7, server X 504 recognizes that a PUID has been provided by this default user (U2) and in response builds a corresponding SID 532 that is then placed in a token 530 associated with the default user (U2) who is seeking access to object 516. In certain implementations, a SID is built by passing the PUID to an application programming interface (API) called LsaLogonUser. This API returns the SID.

In act #8, server X 502 determines if this default user (U2) has appropriate access permission(s) to access object 516 by comparing one or more SID(s) in the default user's token 530 with those in ACL 518. Here, SID 532 from token 530 would match SID 522 in ACE 520. Consequently, in act #9, an authentication context 526 is created for U2, which allows U2 to access object 516 in accordance with the applicable permission settings. Hence, for example, U2 could view (read) the planning calendar of U1 and determine if U1 and U2 might be able to have lunch together next week. U2 did not logon to server X 502; indeed U2 cannot logon to server X 502 since U2 does not have an account, as does U1. Authentication of U2 in this case is essentially based on trust relationships 510, 512 and 514, and the initial authentication of U2 using client 508 and server Y 504. Access control of U2 to server X 502 is granted based essentially on the trusted authorization of U1 (through client 506 and server X 502 in Act #0) and trust relationship with server Y 504 in providing PUID 524 in act #3.

One of the benefits to using the PUID is that the resulting SID will be globally unique and persistent based on the controlled assignment of PUIDs by Passport.

SUMMARY

Although some preferred implementations of the various methods and systems of the present invention have been illustrated in the accompanying Drawings and described in the foregoing Detailed Description, it will be understood that the invention is not limited to the exemplary embodiments disclosed, but is capable of numerous rearrangements, modifications and substitutions without departing from the spirit of the invention as set forth and defined by the following claims.

What is claimed is:

1. A method for providing a first user with controlled access to a local computing resource without requiring that the first user have a unique user account associated with the local computing resource, the method comprising:
    receiving an identifier of the first user from a second user that has a unique user account associated with the local computing resource;
    associating a security identifier (SID) of the first user with the local computing resource based on the identifier received from the second user;
    when the first user attempts to access to the local computing resource, receiving a pair wise unique identifier (PUID) associated with the first user that is to be provided access to said local computing resource, said PUID being associated with an external computing resource that has authenticated the first user based on an electronic mail (e-mail) address associated with the first user;
    translating said PUID into a corresponding security identifier (SID) by providing said PUID to an application programming interface (API) and in return receiving the corresponding SID from said API;
    determining when the corresponding SID matches the associated SID using an access control mechanism associated with said local computing resource; and
    providing the first user controlled access to the local computing resource based on the determination.

2. The method as recited in claim 1, wherein said PUID is associated with a Passport service.

3. The method as recited in claim 1, wherein translating said PUID into said corresponding SID further includes:
    separating said PUID into at least one sub authority identifier portion and at least one member identifier portion.

4. The method as recited in claim 1, wherein receiving said PUID further includes:
    receiving said PUID within a Kerberos-based message.

5. The method as recited in claim 4, wherein said PUID is provided in a PAC within said Kerberos-based message.

6. The method as recited in claim 4, wherein said Kerberos-based message is associated with an S4U2self process.

7. The method as recited in claim 4, wherein said Kerberos-based message is associated with an S4U2proxy process.

8. The method as recited in claim 1, wherein:
    the associated SID is stored within an access control list (ACL) associated with said at least one computing resource; and
    determining when the corresponding SID matches the associated SID further includes comparing the corresponding SID to the ACL.

9. The method as recited in claim 1, wherein providing the first user controlled access to the local computing resource further includes:
    providing a default account for the first user to access said at least one computing resource.

10. A computer-readable medium having computer-executable instructions for performing acts comprising:
    associating a security identifier (SID) of a first user with a local computing resource based on an electronic mail (e-mail) address associated with the first user that is provided by a second user having a user account to access the local computing resource;
    accepting a pair wise unique identifier (PUID) associated with the first user that is to be provided controlled access to the local computing resource, said PUID being associated with an external computing resource that has authenticated the first user based on the first user providing the electronic mail (e-mail) address associated with the user to the external computing resource;
    converting said PUID into a corresponding security identifier (SID) by outputting said PUID to an application programming interface (API) and, in return, receiving the corresponding SID from said API;
    verifying that the corresponding SID matches the associated using an access control mechanism associated with said local computing resource; and
    allowing controlled access to the local computing resource responsive to the act of verifying and without requiring that the first user have a unique user account associated with the local computing resource.

11. The computer-readable medium as recited in claim 10, wherein said PUID is associated with a Passport service.

12. The computer-readable medium as recited in claim 10, wherein converting further includes:
    subdividing said PUID into at least one sub authority identifier portion and at least one member identifier portion.

13. The computer-readable medium as recited in claim 10, wherein receiving said PUID further includes:
    receiving said PUID within a Kerberos-based message.

14. The computer-readable medium as recited in claim 13, wherein said PUID is provided in a PAC within said Kerberos-based message.

15. The computer-readable medium as recited in claim 13, wherein said Kerberos-based message is associated with an S4U2self process.

16. The computer-readable medium as recited in claim 13, wherein said Kerberos-based message is associated with an S4U2proxy process.

17. The computer-readable medium as recited in claim 10, wherein verifying further includes:
    comparing the corresponding SID to an access control list (ACL) associated with said local computing resource the ACL including the associated SID.

18. The computer-readable medium as recited in claim 10, wherein accepting said PUID associated with the first user that is to be provided controlled access to said local computing resource further includes:
    providing a default account for the first user that is to be provided access to said local computing resource.

19. A computer-readable medium having computer-executable instructions for performing acts comprising:
    associating a security identifier (SID) of a first user with a local computing resource based on an electronic mail (e-mail) address associated with the first user that is input by a second user having a user account to access the local computing resource;
    receiving a pair wise unique identifier (PUID) associated with an authentication context of the first user with an external resource;

translating said PUID into a corresponding security identifier (SID) associated with the authentication context by subdividing said PUID into at least one sub authority identifier portion and at least one member identifier portion, and arranging said at least one sub authority identifier portion and said at least one member identifier portion as said SID; and selectively providing the first user controlled access to the local computing resource based on a comparison of the corresponding SID to the SID associated with the local computing resource.

20. The computer-readable medium as recited in claim 19, wherein arranging said at least one sub authority identifier portion and said at least one member identifier portion as said SID further includes arranging said SID to have said sub authority identifier, a HIWORD(MemberIDHigh), a LOWORD(MemberIDHigh), and a MemberIDLow.

21. The computer-readable medium as recited in claim 19, further comprising outputting said SID.

22. A system for controlling access to at least one computing resource, the system comprising:

memory; and logic operatively coupled to said memory and configurable to:

associate a security identifier (SID) of a first user with said at least one computing resource based on an electronic mail (e-mail) address associated with the first user that is input by a second user having access to said at least one computing resource, the first user to be provided controlled access to said at least one computing resource by the second user;

receive a unique identifier associated with the first user through an electronic mail (e-mail) address for the first user, said unique identifier being associated with another computing resource that has authenticated the first user based on the e-mail address for the first user, said logic being further operatively configured to translate said unique identifier into a corresponding security identifier (SID), and allowing said first user to access said at least one computing resource if said corresponding SID matches said SID associated with said at least one computing resource that is stored in said memory and without requiring that the first user have a unique user account associated with said at least one computing resource.

23. The system as recited in claim 22, wherein said unique identifier includes a pair wise unique identifier (PUID).

24. The system as recited in claim 23, wherein said PUID is associated with a Passport service.

25. The system as recited in claim 24, wherein said logic is further configured to separate said Passport unique identifier into at least one sub authority identifier portion and at least one member identifier portion.

26. The system as recited in claim 22, wherein said logic is configurable to receive said unique identifier within a Kerberos-based message.

27. The system as recited in claim 26, wherein said unique identifier is provided in a PAC within said Kerberos-based message.

28. The system as recited in claim 26, wherein said Kerberos-based message is associated with an S4U2self process.

29. The system as recited in claim 27, wherein said Kerberos-based message is associated with an S4U2proxy process.

30. The system as recited in claim 22, wherein said SID associated with said at least one computing resource that is stored in said memory is part of an access control list (ACL) associated with said at least one computing resource.

31. The system as recited in claim 22, wherein said logic is further configurable to provide an anonymous account capability to the first user that is to be provided access control to said at least one computing resource.

* * * * *